United States Patent Office 3,808,124
Patented Apr. 30, 1974

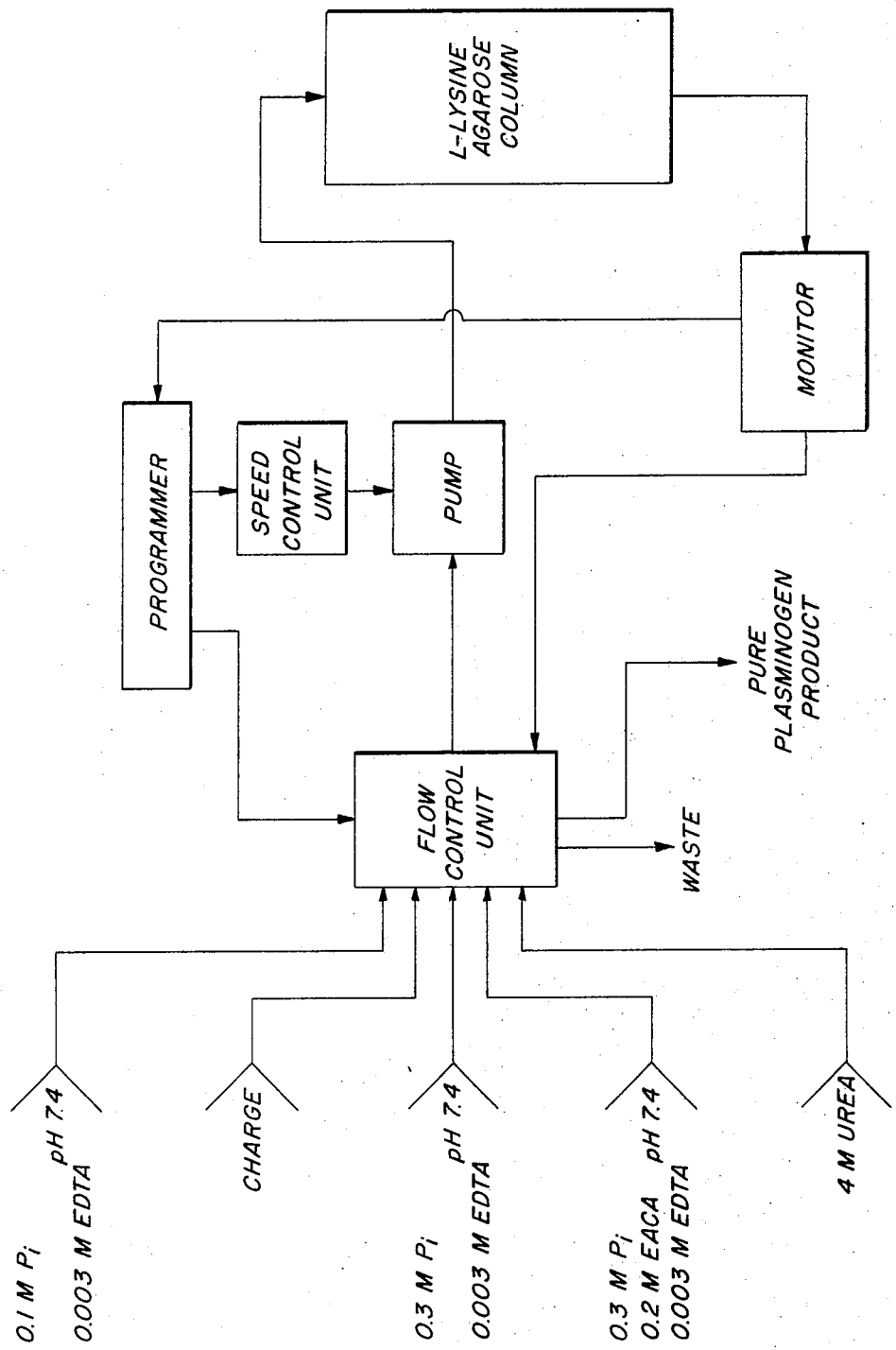

3,808,124
PURIFICATION OF HUMAN PLASMINOGEN
Chester Thaddeus Dziobkowski, Ridgewood, and Paul Hadley Bell, Saddle River, N.J., assignors to American Cyanamid Company, Stamford, Conn.
Filed Apr. 14, 1972, Ser. No. 243,998
Int. Cl. B01d 15/06
U.S. Cl. 210—28                                                    15 Claims

ABSTRACT OF THE DISCLOSURE

A process is described for the isolation of human plasminogen, preferably obtained from Cohn Fraction III, a fraction resulting from the treatment of human blood to separate out other constituents, such as gamma globulin, serum albumin, and the like. Fraction III is usually a by-product and so constitutes a cheap source for plasminogen. The plasminogen is adsorbed from Fraction III by affinity chromatography on lysine or arginine coupled agarose beads. The adsorption is at cold room temperatures, 2°–7° C., using a soluble potassium phosphate buffer and an anti-clotting agent, such as citrates and if desired with a small amount of chelating agent, such as ethylene diamine tetra acetic acid (EDTA). After absorption the beads are washed with a phosphate buffer and eluted with a phosphate buffer containing epsilon-amino caproic acid (EACA). Plasminogen is then recovered, for example by precipitation with ammonium sulfate, and the beads regenerated with a concentrated urea solution, such as 4 molar or stronger. Highly pure plasminogen is produced substantially free from other proteins and from plasmin.

BACKGROUND OF THE INVENTION

Human plasminogen is useful since it can be activated, for example with streptokinase, urokinase, etc., to plasmin, which is an enzyme capable of dissolving fibrin clot.

Various methods of purifying plasminogen have been described, for example, the use of affinity chromatography using lysine coupled solid supports, such as polyacrylamide gel. The process is often carried out at room temperature using sodium phosphate buffers and elution is effected with epsilon-amino caproic acid solutions. The process is not practicable at low temperatures because of the limited solubility of the sodium phosphate buffers. Such a process is described in an article by Rickli and Cuendet in "Biochimica et Biophysica Acta of 1971," November 1971. This article was published subsequent to the completion of the invention of the present application. Another room temperature process is described in an abstract in "Federal Proceedings," volume 29, March 1970, page 647, and by the same authors, Deutsch and Mertz, in "Science," volume 170 (1970), page 1095.

Operation of these processes at the higher temperature results in undesirable degradation of the plasminogen.

SUMMARY OF THE INVENTION

The present invention is an improved process of purifying plasminogen, preferably from the waste product Cohn Fraction III. The process, which uses in some of its steps affinity chromatography, is carried out at low temperatures, such as are used in a cold room, for example, from 0° C. to about 7° C. or slightly higher. Normally, to prevent any danger of freezing, a temperature range of 2° C. to 7° C. is used, and this safer range is preferred. The raw material should contain anti-clotting agents, such as, for example, citrate, and it is desirable to provide a sequestering agent, such as ethylene diamine tetra acetic acid, which will be referred to throughout the remainder of the specification as EDTA. This removes or sequesters Group II metal ions, such as calcium, which favor the production of fibrin from the fibrinogen, present in the starting blood fractions. Other sequestering or chelating agents may be used, but as EDTA is widely available, it is preferred.

The adsorption is on solid supports which have been coupled with amino acids. It is preferred to use beads of agarose, formed from the carbohydrate or agar, as this substance can be precipitated as spherical beads which have large pores capable of receiving large molecules, such as plasminogen. The amino acid preferred is lysine, but other amino acids may be used, such as arginine. Other solid supports, such as polyacrylamide or dextran beads, normally known by their trade name, "Sephadex," may also be employed. They are, however, less satisfactory than the agarose beads as they have much less surface and smaller pores. Nevertheless, they are not excluded from the broader aspects of the present invention. The coupling of the lysine or arginine is effected by well known methods, the supporting agarose beads, for example, being activated with cyanogen bromide. This permits the α-amino group of the lysine or arginine to couple firmly with the support. This procedure is well known, and while it is a necessary step in the present invention, it is not what distinguishes it from the prior art.

After adsorption of the plasminogen, it is eluted at the same low temperature with phosphate buffered amino acid solutions. The amino acids should have from 4 to 7 carbon atoms between at least one of their basic groups and their acidic group. The best and cheapest and, therefore, preferred amino acid is epsilon amino caproic acid, which will be referred to in the remainder of the specification as EACA. The maximum elution is effected when the amino acid has a carbon chain of 6, although, as has been pointed out above, in the range from 4 to 7 they are still useful. Another 6-carbon amino acid, lysine, may also be employed, but as it is considerably more expensive than EACA, which is produced in enormous tonnages as a raw material for producing caprolactam for Nylon-6, it is preferred economically. The elution, which is still at the low temperature, uses the potassium phosphate buffer at about a pH of 7.4, which is, however, not critical, and is preferably in the presence of some EDTA to sequester calcium ions. Before elution it is preferable to wash the beads with potassium dihydrogen phosphate and a little EDTA at the same approximate pH of 7.4. The washing is carried out until absorption at 280 nanometers has dropped to a low point, for example, not over 0.01. This washing removes other proteins which are not tied to the omega amino group of the lysine or the corresponding guanidino group of arginine. These proteins are undesirable as they may produce anaphylactic reactions in persons sensitized to them. Also, the washing removes more or less completely any contaminating hepatitis virus which may be present.

After washing, elution is effected with a potassium phosphate buffer, preferably a small amount of EDTA, and EACA or other elutant of the amino acid type. In order to cause the plasminogen to be released from the lysine amino group, salts must be present and can be and preferably are the potassium phosphate buffers.

Plasminogen is then precipitated from the eluate by means of ammonium sulfate, which serves to eliminate EACA. This is desirable as EACA inhibits activation of the plasminogen when it is finally used. The ammonium sulfate precipitation may be repeated one or twice, and highly purified plasminogen is obtained, the plasminogen being separated by suitable means, for example, by centrifugation. This step is also effected, as all of the preceding steps, at cold room temperature. High yields of very pure plasminogen, approaching 100% purity by the Chase and Shaw method involving titration with p-nitro-phenyl-p'-guanidinobenzoic acid, are obtained. If lysine is used in place of EACA in the elution, the ammonium sulfate precipitation step does not need to be repeated as lysine does not act as an activation inhibitor when the plasminogen is actually used. The invention really ends when the purified plasminogen is produced. This product can be redissolved in an ammonium acetate-L-lysine solution at a moderately acid pH, such as 5, and freeze dried or held in the frozen state.

The process steps described lend themselves to a continuous process in a chromatographic column, and for many purposes this is the most desirable modification. It is, however, possible to effect the adsorption on the amino acid coupled to a solid support and the other steps in a batch process. Economically this sometimes is advantageous as very large containers may be used. On the other hand, it is necessary to separate solids from liquids in the various steps, which can be effected by various filtration methods and even, where settling of the substrate beads is adequate, by decantation. The present invention is a process application and is not limited to continuous column chromatography or to batch operation. The particular modification can, therefore, be chosen in accordance with economic factors, simplicity of operating procedures, and the like. The added flexibility of the present invention, therefore, represents a practical advantage.

After elution, the solid adsorbent, such as lysine coupled agarose beads, are then regenerated by washing with concentrated aqueous solutions of urea, preferably at least 4 molar. This is then followed by washing with more of the dilute phosphate buffer and a small amount of EDTA, and the beads are then ready for the cycle to be repeated. The washing with a strong aqueous urea solution constitutes one of the novel features of the present invention, with or without a second washing with buffered EDTA solution.

BRIEF DESCRIPTION OF THE DRAWING

The drawing is a flow sheet of a completely automated column modification.

DESCRIPTION OF THE PREFERRED EMBODIMENTS

Most of the operating examples which follow deal with the chromatographic column modification of the invention and thus follow the flow sheet in the drawing. It should be understood that the various in-flows, shown at one side of the drawing, do not all flow at the same time. It is the function of the flow control unit, which is controlled by the programmer and monitor, to bring about the desired sequential operation. In the drawing, in addition to other abbreviations, the ortho phosphate buffer abbreviated $P_i$.

EXAMPLE 1

This example describes preparation of L-lysine-agarose beads, which are the preferred substrates of the present invention. A 1000 ml. portion of agarose of size 100–200 mesh, which is sold by Bio·Rad Laboratories of Richmond, Calif., under their designation Bio-Gel A–15M, was washed with 12 liters of water on a filter funnel and suspended in an equal volume of water. One liter of a 10% CNBr solution was added. The pH was adjusted to 11.0 by addition of 4 M NaOH and held at pH $11.0 \pm 0.2$ by continuous addition of alkali. After eight minutes the agarose was filtered from the reaction mixture and washed with 16 liters of cold (4° C.) 0.1 M NaHCO$_3$, pH 9.0. The agarose was suspended in 1 liter of 0.1 M NaHCO$_3$, pH 9.0, and a solution of 200 grams of L-lysine hydrochloride in 600 ml. of water, pH 9.0, was added. The mixture was placed in a refrigerator at 4° C. and stirred gently for 24 hours. The lysine agarose beads were filtered from the reaction mixture and washed with 10 liters of water (25° C.). The beads were equilibrated with 0.1 M phosphate buffer, pH 7.4 (K$^+$ salt), 0.003 M EDTA, pH 7.4, and poured into a column. After cooling to 4° C., it was ready for use.

EXAMPLE 2

Purification of human plasminogen

One hundred grams of Cohn Fraction III were suspended in 3200 ml. of 0.95% NaCl. A solution of 15.5 grams of citric acid monohydrate in 100 ml. of water and adjusted to pH 7.4 with solid KOH and 2.8 grams of EDTA was added. The suspension was stirred for one hour and filtered through a coarse porosity sintered glass funnel. The filtrate was diluted with an equal volume of cold water (4° C.). The filtrate was pumped onto a column (33 cm. by 9.3 cm. inside diameter) packed with 2.25 liters of lysine agarose beads. The flow rate was 11 ml./cm.$^2$/hour. The column was washed at 4° C. with 0.3 M potassium phosphate buffer+0.003 M EDTA adjusted to pH 7.4 with solid KOH. The flow rate was 11 ml./cm.$^2$/hour. Washing was completed when the absorbance at 280 nanometers had dropped to less than 0.010.

At 4° C. elution with 0.2 M EACA, pH 7.4, removed only 15% of the protein adsorbed. Approximately 10 ml. of the lysine agarose beads containing the adsorbed plasminogen were placed in each of four glass columns (11 cm. by 1.1 cm. inside diameter). They were eluted with four different buffers, 0.2 M EACA+0.3 M potassium phosphate buffer, pH 7.4; 0.5 M EACA, pH 7.4; 0.2 M EACA+0.6 M ammonium acetate, pH 5.0, and 0.6 M ammonium acetate, pH 5.0. All four of these buffers eluted plasminogen from the lysine agarose beads at 4° C., giving about 2 mg. of pure plasminogen per 10 ml. of beads.

The remainder of the beads was eluted with the 0.2 M EACA+0.3 M potassium phosphate buffer, pH 7.4. Solid ammonium sulfate was dissolved in the plasminogen eluate to a concentration of 310 mg./ml. After standing at 4° C. for 30 minutes, the precipitate was collected by centrifugation for 15 minutes at 10,000×g. The precipitate was dissolved in 60 ml. of 0.05 M ammonium acetate+0.2 M L-lysine hydrochloride, pH 5.0, and stored frozen at −75° C. This process, which was run entirely at 4° C., yielded 545 mg. of plasminogen. Direct titration of the product with p-nitrophenyl-p'-guanidinobenzoic acid indicated this preparation was 77% pure.

Although the treatment of the purified plasminogen for storage in the frozen state is not a distinguishing feature of the present invention, it is included to complete the example to a commercially useful product. The yields and purity are typical, but, as always, can vary somewhat from one batch of Cohn Fraction III to another.

EXAMPLE 3

Purification of plasminogen by small column process

A solution of 15.5 grams of citric acid monohydrate and 2.8 grams of EDTA in 100 ml. of water was adjusted to pH 7.4 with solid KOH. This solution was added to 3200 ml. of 0.95% NaCl. One hundred grams of Cohn Fraction III were suspended in this solution, then the suspension was placed in a refrigerator at 4° C. and stirred for one hour. The mixture was filtered through a coarse porosity sintered glass funnel and diluted with an equal volume of cold (4° C.) water. The filtrate was pumped onto a column (33 cm. by 9.3 cm. inside diameter) packed with 2.24 liters of lysine agarose beads. The flow rate was 22.1 ml./cm.$^2$/hour. The column was washed with 0.3 M KH$_2$PO$_4$+0.003 M EDTA adjusted to pH 7.4 with solid KOH. The flow rate was 8 ml./cm.$^2$/hour. Washing was completed with the absorbance at 280 nanometers had dropped to less than 0.010.

The plasminogen was eluted from the column using 0.3 M KH$_2$PO$_4$+0.003 M EDTA+0.2 M EACA solution adjusted to pH 7.4 with KOH at a flow rate of 1.9 ml.

cm.²/hour. Solid ammonium sulfate was dissloved in the plasminogen fraction to a concentration of 310 mg./ml. After standing at 4° C. for two hours, the precipitate was collected by centrifugation for 15 minutes at 10,000× g. The precipitate was dissolved in 60 ml. of 0.05 M ammonium acetate+0.02 M L-lysine hydrochloride at pH 5.0 and stored frozen at −75° C. This process, which was run entirely at 4° C., yielded approximately 375 mg. of plasminogen. Direct titration of the product according to the method of Chase and Shaw with p-nitrophenyl-p'-guanidinobenzoic acid indicated that this preparation was 100% pure.

EXAMPLE 4

Purification of human plasminogen (in a larger column)

A solution of 30.4 grams of NaCl, 15.5 grams of citric acid monohydrate and 2.8 grams of EDTA in 3200 ml. of water was adjusted to pH 7.4 with solid KOH. One hundred grams of Cohn Fraction III were suspended in this solution and stirred for five minutes. The suspension was placed in a refrigerator (4° C.), allowed to stand for 10 minutes, then diluted with 3200 ml. of cold (4° C.) water. After three hours the suspension was filtered through cheesecloth. The filtrate was pumped onto a column (23 cm. by 11.2 cm. inside diameter) packed with 2.24 liters of lysine-agarose beads with a flow rate of 18.6 ml./cm.²/hour. The column was washed with 14 liters of buffer, 0.3 M $KH_2PO_4$+0.003 M EDTA adjusted to pH 7.4 with solid KOH at a flow rate of 5.9 ml./cm.²/hour. Washing was completed when the absorbance at 280 nanometers had dropped to less than 0.010.

The plasminogen was eluted with the 0.3 M phosphate buffer to which was added solid EACA to a concentration of 0.2 M at a flow rate of 1.9 ml./cm.²/hour. Solid ammonium sulfate was dissolved in the plasminogen fraction to a concentration of 310 mg./ml. After standing at 4° C. for 30 minutes, the precipitate was collected by centrifugation for 15 minutes at 10,000×g. The precipitate was dissolved in 60 ml. of 0.05 M ammonium acetate+0.02 M L-lysine hydrochloride at pH 5.0 and stored frozen (−75° C.). The process, which was run entirely at 4° C., yielded approximately 500 mg. of plasminogen.

EXAMPLE 5

Regeneration of L-lysine agarose column

On completion of the elution as described in Example 4, the column was regenerated by back washing with 10 liters of 4 M urea solution with a flow rate of 6.4 ml./cm.²/hour. This was followed by washing with 10 liters of 0.1 M phosphate+0.003 M EDTA, pH 7.4, buffer at the same flow rate. The column was then ready for the next cycle as described in Example 4.

EXAMPLE 6

Purification of human plasminogen (batch process)

A solution of 91.4 grams of NaCl, 46.5 grams of citric acid monohydrate and 8.4 grams of EDTA in 600 ml. of water was adjusted to pH 7.4 with solid KOH. Three hundred grams of Cohn Fraction III were suspended in this solution and stirred for one and one-half hours at 4° C. The suspension was diluted with 18.6 liters of cold distilled water. The suspension was allowed to stand overnight at 4° C. (16 hours). The suspension was filtered through cheesecloth and divided into two equal parts. Each part was slowly mixed with 950 ml. of lysine-agarose beads for three hours. The beads were allowed to settle for one hour and the supernatant removed with a siphon. The beads were suspended in 10 liters of buffer, 0.3 M $KH_2PO_4$+0.003 M EDTA adjusted to pH 7.4 with solid KOH, and allowed to settle for one hour. The supernatant was removed with a siphon. The bead wash was repeated twice more with 10 liter portions of cold distilled water (4° C.). The beads were poured into a glass column. The contents of the column were washed with 7 liters of 0.3 M potassium phosphate buffer, with a flow rate of 8.5 ml./hour/cm.². The washing was completed when the absorbance at 280 nanometers had dropped to 0.010.

The plasminogen was eluted with the 0.3 M potassium phosphate buffer to which was added solid EACA to a concentration of 0.2 M, at a flow rate of 5.6 ml./cm.²/hours. Solid ammonium sulfate was dissolved in the plasminogen fraction to a concentration of 310 mg./ml. After standing at 4° C. for two hours, a precipitate was collected by centrifugation at 10,000×g. The precipitate was dissolved in 0.05 M ammonium acetate+0.02 M L-lysine hydrochloride at pH 5.0 and diluted to 168 ml. It was stored frozen at −75° C. The process, which was run entirely at 4° C., yielded approximately one gram of plasminogen. Direct titration of the product according to the method of Chase and Shaw with p-nitrophenyl-p'-guanidinobenzoic acid indicated this preparation was about 74% pure.

We claim:

1. A process for the purification of human plasminogen comprising the following steps, all of which are operated at temperatures from 0° C. to about 7° C.:
    Step 1. adsorbing an aqueous dispersion of impure material containing human plasminogen onto porous solid supports coupled with an amino acid selected from the group consisting of L-lysine and L-arginine, the adsorption being buffered to a pH of approximately 7.4,
    Step 2. washing the support carrying the adsorbed plasminogen with a potassium phosphate buffer at a concentration of at least .3 M, said buffer being soluble in water to at least .3 M concentration at 0° C. to about 7° C.,
    Step 3. eluting the washing support with an aqueous solution until plasminogen has been substantially eluted,
    Step 4. precipitating plasminogen from the eluate and separating it from its mother liquor, and
    Step 5. regenerating the amino acid coupled solid supports by washing with an aqueous solution of urea of concentration at least 4 M.
2. A process according to claim 1 in which the solid support is agarose beads.
3. A process according to claim 1 in which the amino acid coupled to the solid support is L-lysine.
4. A process according to claim 1 in which the material containing human plasminogen is Cohn Fraction III.
5. A process according to claim 2 in which the material containing human plasminogen is Cohn Fraction III.
6. A process according to claim 3 in which the material containing human plasminogen is Cohn Fraction III.
7. A process according to claim 1 in which the elution step 3 is effected with a solution containing epsilon amino caproic acid.
8. A process according to claim 4 in which the elution step 3 is effected with a solution containing epsilon amino caproic acid.
9. A process according to claim 5 in which the elution step 3 is effected with a solution containing epsilon amino caproic acid.
10. A process according to claim 6 in which the elution step 3 is effected with a solution containing epsilon amino caproic acid.
11. A process according to claim 1 in which a sequestering agent of the ethylene diamine tetra acetic acid type is used in step 1.
12. A process according to claim 11 in which the ethylene diamine tetra acetic acid type sequestering agent is present in step 1, step 2 and step 3.
13. A process according to claim 1 in which the steps are part of a column chromatographic process.
14. A process according to claim 2 in which the steps are part of a column chromatographic process.

15. A process according to claim 3 in which the steps are part of a column chromatographic process.

References Cited

UNITED STATES PATENTS 3,150,060   9/1964   Sanders et al. _____ 195—66 B

OTHER REFERENCES

D. G. Deutsch et al., "Science," vol. 170, December 1970, pp. 1095–1096.

S. Nagasawa et al., Chemical Abstracts, vol. 71, 1969, #109136r.

SAMIH N. ZAHARNA, Primary Examiner

I. CINTINS, Assistant Examiner

U.S. Cl. X.R.

210—31 R, 36; 260—112 B